(12) United States Patent
Ludwig et al.

(10) Patent No.: US 9,706,168 B1
(45) Date of Patent: Jul. 11, 2017

(54) ROOM CONFERENCING SYSTEM WITH HEAT MAP ANNOTATION OF DOCUMENTS

(71) Applicant: Surround.IO, Seattle, WA (US)

(72) Inventors: John Ludwig, Bellevue, WA (US); Richard Tong, Seattle, WA (US)

(73) Assignee: Surround.IO, Seattle, WA (US)

( * ) Notice: Subject to any disclaimer, the term of this patent is extended or adjusted under 35 U.S.C. 154(b) by 0 days.

(21) Appl. No.: 14/882,430

(22) Filed: Oct. 13, 2015

Related U.S. Application Data

(60) Provisional application No. 62/063,014, filed on Oct. 13, 2014.

(51) Int. Cl.
| | |
|---|---|
| *H04N 7/15* | (2006.01) |
| *G06F 17/24* | (2006.01) |
| *H04N 7/18* | (2006.01) |
| *G06T 7/20* | (2017.01) |
| *G06K 9/18* | (2006.01) |
| *H04N 7/14* | (2006.01) |

(52) U.S. Cl.
CPC .............. *H04N 7/15* (2013.01); *G06F 17/241* (2013.01); *G06K 9/18* (2013.01); *G06T 7/20* (2013.01); *H04N 7/147* (2013.01); *H04N 7/183* (2013.01); *G06T 2207/30204* (2013.01)

(58) Field of Classification Search
CPC .......... H04L 65/403; G06F 17/30843; G06F 17/30056; G06F 2201/86; G06F 17/241; G06Q 10/101; G06Q 10/103; G06Q 10/1095; G09B 5/02; H04N 21/42202; H04N 7/15; H04N 1/00002; H04N 21/44008; H04N 21/84; H04N 7/183; H04N 7/147; G06K 9/00751; G06K 9/18; G06T 7/20; G06T 2207/30204
See application file for complete search history.

(56) References Cited

U.S. PATENT DOCUMENTS

| | | | | |
|---|---|---|---|---|
| 8,286,070 | B2 * | 10/2012 | Merril | G02B 26/0816 715/203 |
| 2003/0234772 | A1 * | 12/2003 | Zhang | G06F 17/30843 345/177 |
| 2010/0245563 | A1 * | 9/2010 | Golovchinsky | H04N 7/18 348/135 |
| 2012/0324372 | A1 * | 12/2012 | Kowalkiewicz | G06Q 10/101 715/753 |
| 2013/0024756 | A1 * | 1/2013 | Basso | H05B 37/02 715/202 |
| 2014/0129725 | A1 * | 5/2014 | Junqua | H04L 65/403 709/227 |
| 2014/0139426 | A1 * | 5/2014 | Kryze | G06F 3/011 345/156 |
| 2016/0073054 | A1 * | 3/2016 | Balasaygun | H04N 7/15 348/14.08 |

* cited by examiner

*Primary Examiner* — Stella Woo
(74) *Attorney, Agent, or Firm* — FSP LLC (57) ABSTRACT

A method includes capturing a first image at a first time using a camera; processing the first image to identify a representation of an object in the first image; storing the first image as an event forming a navigable marker in a conference room tracking system; measuring one or more of a room sound and a room activity level at a time associated with capture of the first image; generating a heat marker representing a level of the room sound or the room activity level; and storing the heat marker in association with the event.

14 Claims, 9 Drawing Sheets

ROOM CONFERENCING SYSTEM WITH HEAT MAP ANNOTATION OF DOCUMENTS

CROSS-REFERENCE TO RELATED APPLICATIONS

This application claims priority and benefit under 35 u.s.c. 119 to U.S. application Ser. No. 62/063,014, filed on Oct. 13, 2014, which is incorporated herein by reference in its entirety.

BACKGROUND

Conventional room conferencing systems provide for the display and discussion of documents by participants in the conference. However, the interaction of participants with the contents of the documents is often not tracked in ways meaningful to analysis of the conference dynamics. Documents generate interactions between participants and the documents, and among the participants themselves. Tracking these interactions can be valuable to understanding conference efficiency and group dynamics.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Description

Embodiments of a conferencing system are described that utilize local and also (optionally) cloud computing resources along with sensors such as a RAID-C camera, webcams, camera phones, microphones, and other computer sensors to enrich a room conference experience. The sensors may monitor activity in the area and provide these measurements to computing resources that identify activity on a whiteboard with aspects of the presentation, resulting in enhancement of the presentation to reflect the whiteboard activity. Gestures and facial expressions from a person proximate with the whiteboard may be detected and formulated into annotation on documents, and actions that affect the presentation.

In the system multiple cameras may be positioned within the conference area for optimal coverage. The system adjusts for exposure and white balance in the area of exposure. The cameras may record bracketed exposure shots (e.g., HDR) to improve picture quality, and glare reduction may applied using multi exposures from multi cameras.

Additional glare reduction may be obtained via submission of images from one or more mobile devices. Effective glare reduction may be achieved by processing multiple pictures of a whiteboard from different viewing angles, correcting for glare from a static meeting camera. From the feed of images, the system identifies regions that are whiteboards. This process involves both machine component and, potentially, manual components. The system may identify automatically rectangular regions of interest using CV algorithms. These rectangles are potentially digital representations of physical whiteboards, easels, pieces of paper, or other annotation surfaces. The system may then provide a machine user control interface to enable users to define and control which of these regions they want to track during a meeting.

During a meeting, the system may generate a digital stream comprising unique whiteboard images, and the delta layers in between said images. This stream records unique images for a meeting, as well as the unique image images. A useful aspect of this approach is that the initial state of the whiteboard may be applied as a reference frame as subtracted from images during the meeting. Thus if meeting begins with a board that was annotation or residue on it, that initial content may be treated as noise to subtract out of subsequent images.

To determine if an image is unique, the system first determines if an image is stable—i.e. it is invariant over a configured time interval. To determine if an image is invariant, several approaches may be utilized. Pixel comparison of an image and a prior stable image may be applied, subject to some noise threshold level. Noise thresholding may be applied at two levels; first, on a pixel by pixel basis, determine if an individual pixel is "different enough"(e.g., color intensity distance rector) This generates a true/false map for the entire image, second, for the entire image, determine if enough pixels have changed. If a large enough number have changed, then the overall image is different. Pixel velocity may also be applied, (first order derivative of image stream) and pixel acceleration (2nd order) again subject to a configured noise threshold level. Motion sensing may also be applied to detect human activity at/on the whiteboard.

The system may track and correct for ambient lighting drift over a meeting. During the course of meeting the ambient light in the room may change subtly as the sun moves or room lighting changes. This may result in false change detection. The system may account for this drift by constant updating the image baseline. (reference image brighten/saturation, for example)

Once a stable image is identified, the system may determine if it is unique.

A gross comparison may be performed between the image and the prior stable image for ST noise and drift, and factoring in if prior frames or images have been obscured by a human body. If there has been a body moving at the whiteboard, that is a positive indicator that there may be new content to consider. The system may detect human movement with object and face tracking and apply those inputs to parse out parts of the board. Many times people use pieces of the board to create different "slides" or distinct thoughts.

Changes to the whiteboard state deemed relevant by the system may be associated with documents/areas of documents under discussion/presented co-extensively with the changes made to the whiteboard. Annotations (e.g., links, drawings, embedded images) may be made to the presented digital entities (text files, presentation slides, spreadsheets, etc.) representing or pointing to the detected and stored whiteboard changes. In this manner, an integrated record of the presentation, and the interactions/reactions taking place on a whiteboard and within documents/conversations etc. may all be recorded for later playback/analysis.

Embodiments of a conferencing system are described that utilize local and also (optionally) cloud computing resources along with sensors such as a RAID-C camera, webcams, camera phones, microphones, and other computer sensors to enrich a room conference experience. The sensors may monitor activity in the area and provide these measurements to computing resources that identify "heat" (interest/emotion/engagement) with aspects of the presentation, resulting in enhancement of the presentation to reflect the heat. Gestures and facial expressions from audience members or a presenter may be detected and formulated into annotation on documents, and actions that affect the presentation.

A "heat" indication for documents, items in documents, and areas of documents may be generated, and the document annotated accordingly. Annotations may reflect other aspects of a presentation as well, such as time spent discussing a particular document/item/area. Text or email or voice comments presented by audience members may automatically be associated with document features.

DRAWINGS

Figure 1:
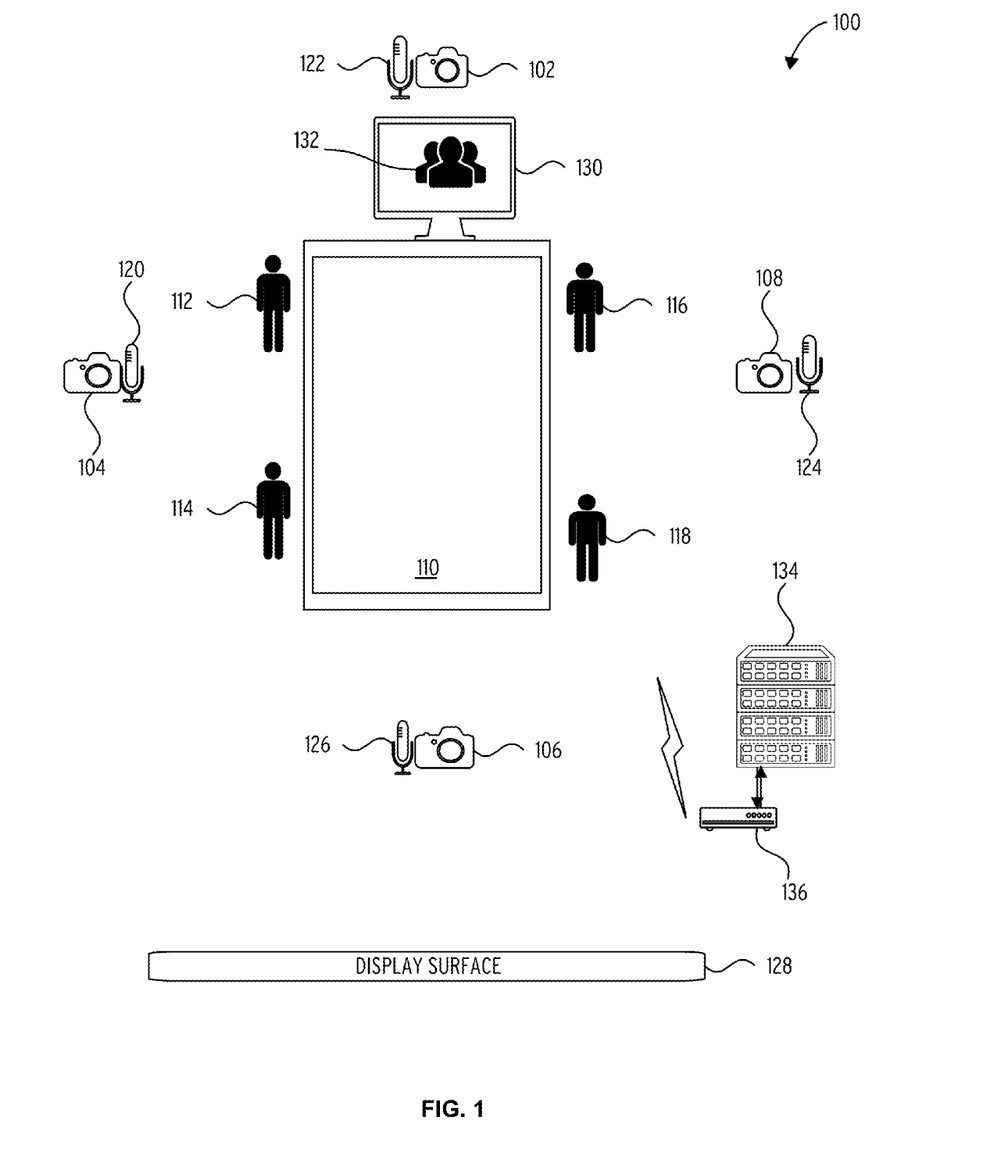
FIG. 1 illustrates an aspect of a room conferencing system 100 in accordance with one embodiment.

FIG. 1 illustrates an aspect of a room conferencing system 100 in accordance with one embodiment. A room conferencing system 100 includes, inter alia, cameras (camera 102, camera 104, camera 106, and camera 108), microphones (microphones 120, microphones 122, microphones 124, and microphones 126), a physical meeting area 110, and a display surface 128. The cameras are positioned around the physical meeting area 110 may be pan-tilt-zoom (PTZ) cameras, adjustable in both viewing direction, zoom, and focus. The microphones are also positioned around the physical meeting area 110 and may or may not be co-located with the cameras. Various people (person 112, person 114, person 116, and person 118) may be physically present around the physical meeting area 110.

In some cases participants at the physical meeting area 110 may be may be "virtually" present via a telecommunication link (via audio/video conference, for example). For example, the virtual participants 132 may appear virtually in the meeting via a machine display device 130. One or more of the cameras may be positioned to record images or video of the machine display device 130, or the contents may be recorded from a display memory of the machine display device 130.

The room conferencing system 100 includes a display surface 128 which may be digital (a machine display device) or which may be analog, e.g. a white board. One or more of the cameras are positioned to record images or video of the display surface 128.

Figure 3:
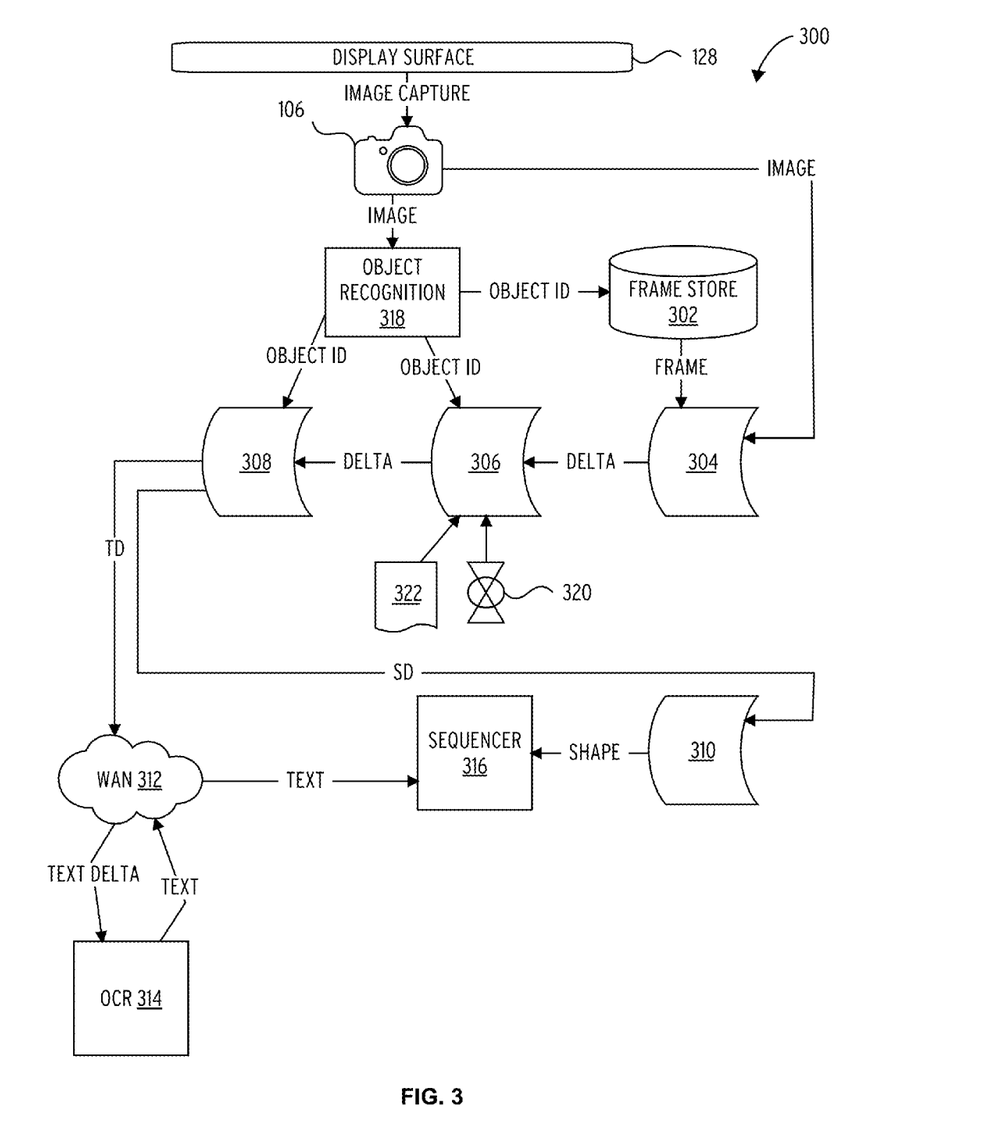
FIG. 3 illustrates an aspect of a display surface evolution tracking system 300 in accordance with one embodiment.

Each of the devices in the room conferencing system 100 may communicate with a conference server 134, which implements aspects of a display surface evolution tracking system 300 as described herein. The devices of the room conferencing system 100 may communicate with the conference server 134 using known networking technologies, such as a wireless router 136.

Figure 2:
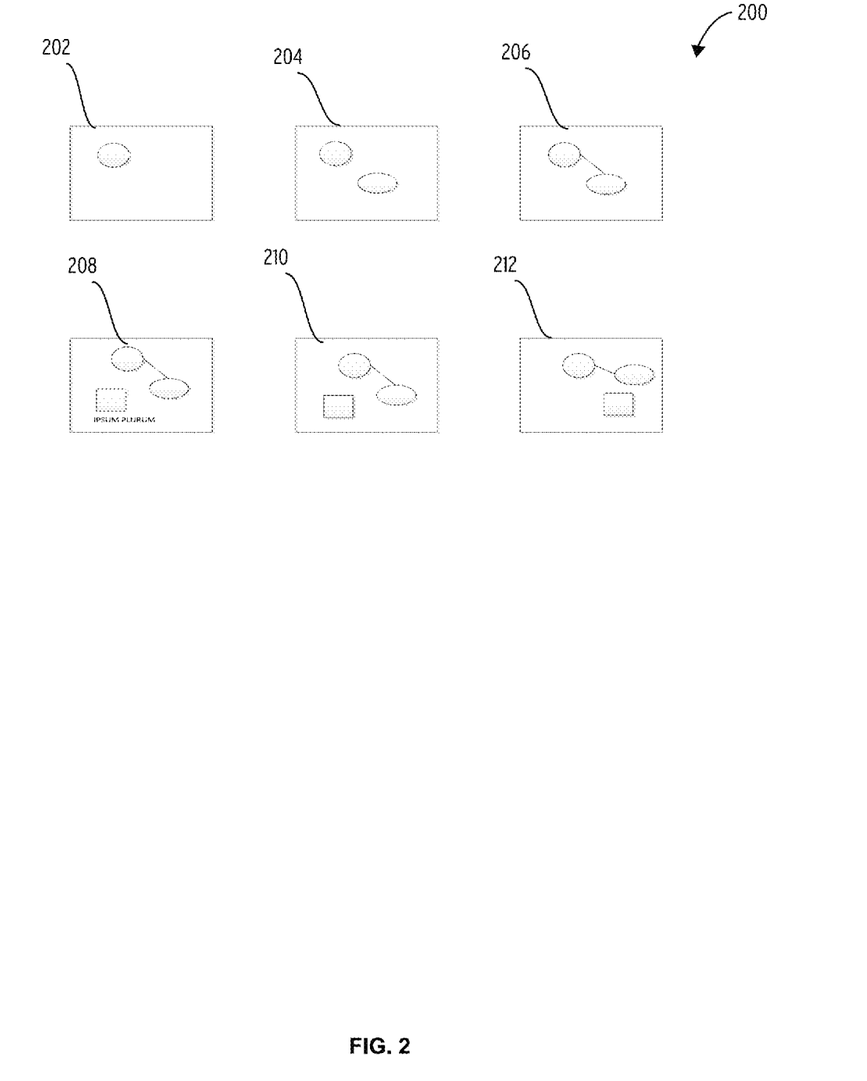
FIG. 2 illustrates a display surface evolution 200 in accordance with one embodiment.

FIG. 2 illustrates a display surface evolution 200 of a display surface 128 in accordance with one embodiment. In this example at surface time 0 202 the whiteboard is initially blank (with possible residue from past meetings), and at some point a new shape is drawn on the surface. The room conferencing system 100 detects the new shape on the display surface 128 through various means, as discussed supra. The whiteboard contents at surface time 0 202 are committed to the room conferencing system 100 as a saved event once it is stable for a configured period of time.

Another shape is drawn on the display surface 128 at surface time 1 204 and this event is also committed to the room conferencing system 100 after a time. The shapes are then connected at surface time 2 206 and this event is committed to the room conferencing system 100. Each event may be accompanied by discussion and interaction within the room by the participant persons (or virtually, over for example a video conferencing link) about the changes taking place on the display surface 128. These interactions are processed into events and recorded in association with the display surface 128 events by the room conferencing system 100.

Another shape is added at surface time 3 208 along with text, resulting in a recorded event. Removal of text or a shape at surface time 4 210 (or any new annotation) may also cause an event to be recorded by the display surface 128. All during this time the room conferencing system 100 is operating the cameras to record the display surface 128, but unless a significant change in excess of a configured threshold is detected, the room conferencing system 100 does not commit the event to the conference record.

Finally, moving a shape on the display surface 128 at surface time 5 212 may result in a recorded event (or the system may determine this is not an event-worthy change, as the move may not represent relevant new information but merely a change in layout of existing information).

Figure 4:
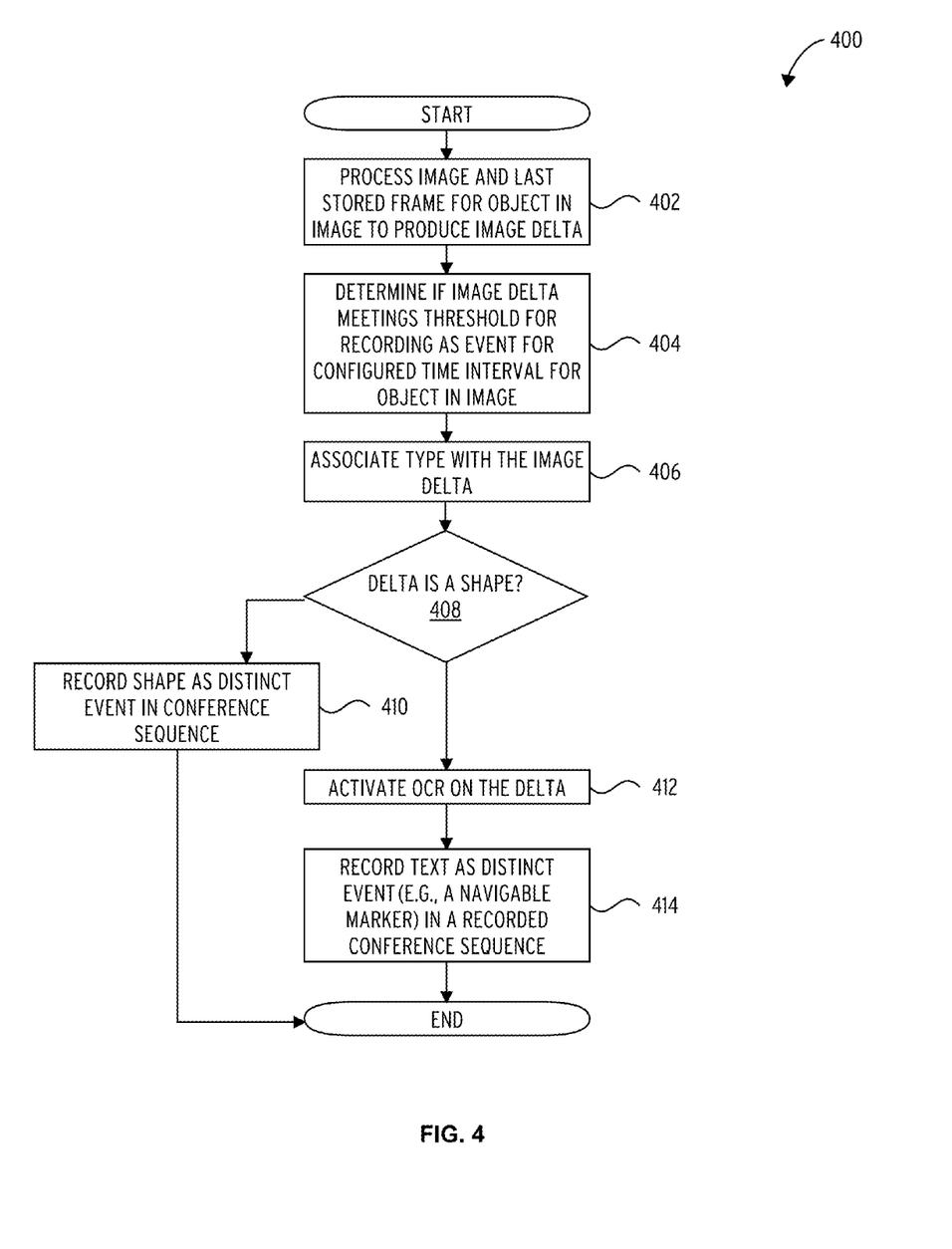
FIG. 4 illustrates an aspect of a display surface evolution tracking process 400 in accordance with one embodiment.

FIG. 3 illustrates an aspect of a display surface evolution tracking system 300 in accordance with one embodiment. FIG. 4 illustrates an aspect of a display surface evolution tracking process 400 in accordance with one embodiment. Collectively, these drawings illustrate an embodiment of a system and process by which a manageable number of meaningful changes of the content of a display surface 128 (which may be a "dumb" board for drawing on with dry markers, or an electronic board/display) may be detected, recorded, and committed into context within a room conferencing system 100.

In some embodiments, the display surface evolution tracking system 300 implements a method that includes capturing a first image of a display surface at a first time using a camera; processing the first image to identify an object forming the display surface; capturing a second image of the display surface at a second time using the camera; processing the first image and the second image to determine a physical change to the display surface that occurred between the first time and the second time; quantifying the physical change to the display surface into a quantified change and comparing the quantified change to a change threshold level; and only if the quantified change is above the change threshold, storing the second image as an event forming a navigable marker in a conference room tracking system.

In some embodiments, such a method may further include the change threshold is different for different types of the object forming the display surface.

In some embodiments, such a method may further include operating typing logic to identify a type of the physical change to the display surface as a change to text or a change to non-text annotations on the display surface and/or if the type of the physical change to the display surface is the change to text, communicating the change to text to OCR (optical character recognition) logic.

In some embodiments, such a method may further include if the type of the physical change to the display surface is the change to non-text annotations, operating object recognition logic to determine a type of the change to non-text annotations.

In some embodiments, such a method may further include if an interval between the first time and the second time is less than a configured threshold interval for the object forming the display surface, discarding the second image so that it is not processed to form the event forming the navigable marker.

The display surface evolution tracking system 300 comprises a display surface 128, a camera 106, a frame store 302, a delta extractor 304, a delta quantifier 306, a delta identifier 308, a shape identifier 310, a WAN 312, an OCR 314, a sequencer 316, and an object recognition 318. A timer 320 and time interval configuration logic 322 are also included in the display surface evolution tracking system 300. Other logic components may also be present but are not essential to a description of the illustrative embodiment(s).

The delta extractor 304 transforms an image of the display surface 128 from the camera 106 and a prior frame (recorded image) of the display surface 128 from the frame store 302 into changes (delta) from the image as compared to the prior frame (block 402). Motion algorithms for digital video known in the art may be utilized for this purpose. The frame provided to the delta extractor 304 from the frame store 302 may be associated with a physical object (e.g., whiteboard, digital display, sheet of paper) being tracked by the system, as identified by the object recognition 318 logic component. Techniques in the art for this purpose include applying exemplars, edge detection, large model bases, statistical comparisons, and so on.

The delta quantifier 306 operates on the image delta from the delta extractor 304 to determine if the delta meets a change threshold sufficient to trigger further processing of the image for shapes or text (block 404). Known techniques for thresholding may be utilized, calibrated for a particular conference or objects in the conference. The delta quantifier 306 may operate as influenced by a number of controls, including the type of object represented in the image (e.g., whiteboard vs digital display surface vs. sheet of paper), an elapsed time from when the comparison frame was recorded (as controlled by timer 320), and the time interval configuration logic 322 for the object id.

The delta identifier 308 operates on the image delta control from the delta quantifier 306 to identify a type value to associate with the delta (e.g., text, shape, annotation, . . . ) (block 406). Known shape recognition techniques, similar to object recognition techniques discussed above, may be utilized for this purpose. Note that typing of the deltas in this way may not be performed in all embodiments. In some cases, only the quantity of changes from a last stable state of the display surface 128 is meaningful in a conference, regardless of the actual type of changes that are occurring. As with other logic components in the display surface evolution tracking system 300, the delta identifier 308 may operate responsive to the object id.

If the delta is a shape or other nontextual change (decision block 408), the shape identifier 310 operates a shape delta (SD) control from the delta identifier 308 and analyzes the shape delta to identify a type of shape (e.g., rectangle, ellipse, triangle, line, . . . ) (block 410). The sequencer 316 receives a shape control from the shape identifier 310 and in response presents the shape (or the overall change to the display surface 128, including the new shape) as part of a recorded and presented conference sequence of events (also block 410). The sequencer 316 stores the second image, e.g. frame, or the delta between the first image and the second image, as an event forming a navigable marker in a conference room tracking system. An operator of the room conferencing system 100 may later navigate to the place in the recorded conference where the event occurred, or utilize the event as a bookmark or other navigable feature of the recorded conference data.

Sometimes the changes to the display surface 128 are text symbols added or changed. These changes may be processed by a slightly different logic chain than shape changes. For example text deltas (TD) identified by the delta identifier 308 may be communicated via a WAN 312 (wide area network, or local area network) a network OCR 314 logic component (block 412). Note that OCR (optical character recognition) may also be performed natively within a device of the room conferencing system 100, or over a local area network (LAN) for the facility hosting the conference, negating the use of OCR services via the WAN 312. The example of utilizing OCR over a WAN 312 is to illustrate that any of the logic utilized by the room conferencing system 100 (delta extraction, delta quantify, etc.) may in fact be executed locally in the room or building hosting the conference, using one or more machine networks of various geographical scope.

The OCR 314 operates on text delta control and produces a text sequence (also block 412). The text control from the OCR 314 is applied via the WAN 312 to the sequencer 316 (516). The sequencer 316 presents the text (or the overall change to the display surface 128, including the new text and any shape changes) as part of a recorded and presented conference sequence of events (block 414).

FIG. 4 illustrates an aspect of a display surface evolution tracking process 400 in accordance with one embodiment.

Figure 5:
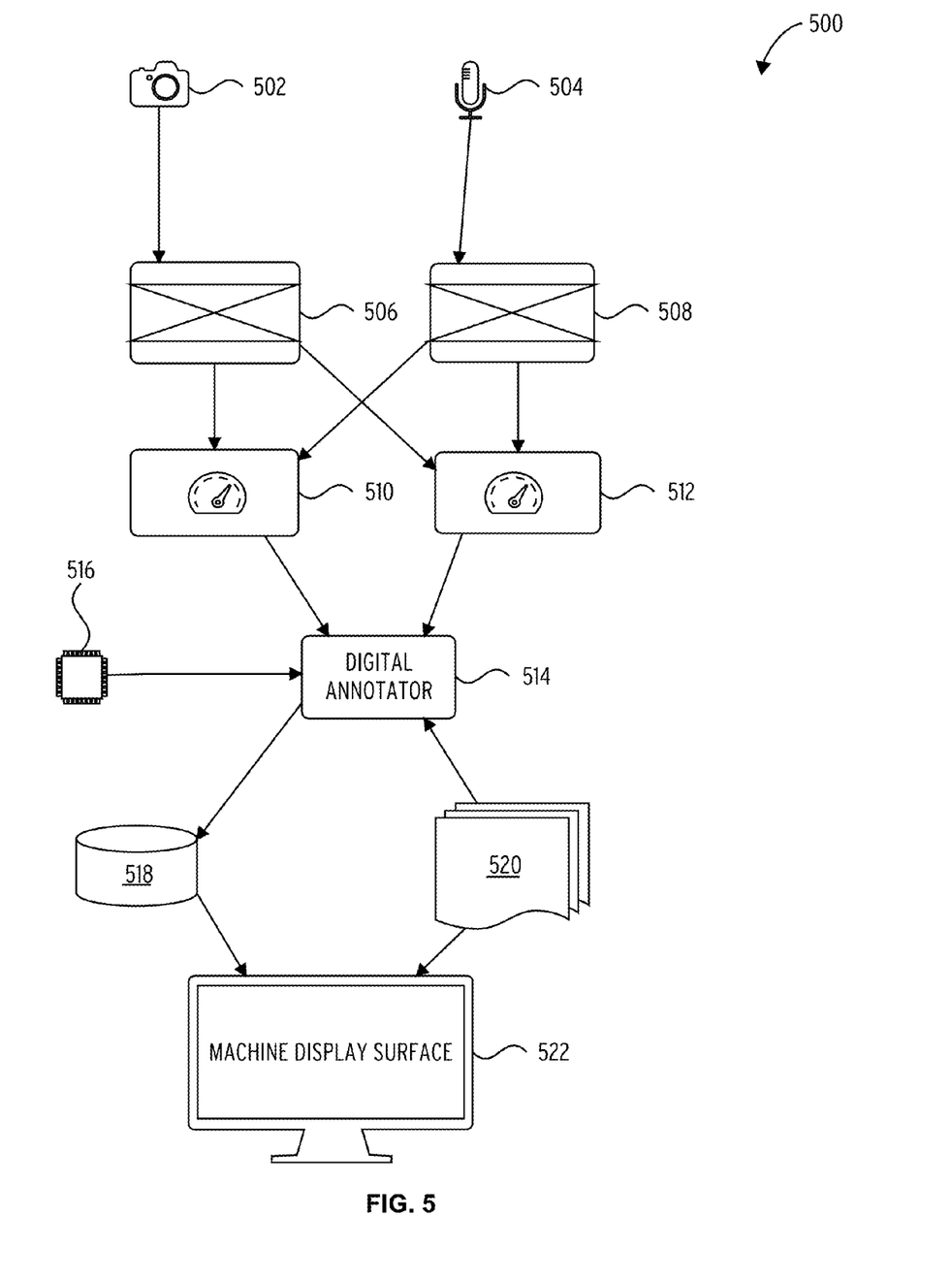
FIG. 5 illustrates a multimedia heat map annotation machine system 500 in accordance with one embodiment.

FIG. 5 illustrates a multimedia heat map annotation machine system 500 in accordance with one embodiment.

Images or video output from the camera 502 are communicated to the gesture and facial analyzer 506 (these may be separate components) which analyzes the images or video for gestures and facial expressions by the conference participants. Audio from the microphone 504 is input to the speech analyzer 508. The speech analyzer 508 analyzes the audio for words and phrases. The outputs of the gesture and facial analyzer 506 and the speech analyzer 508 are input to a contention analyzer 510 and emotion analyzer 512. The emotion analyzer 512 performs biometric voice analysis, and volume and stress analysis, to identify the primary actor (participant id) for the words and phrases from the speech analyzer 508. The participant id from the emotion analyzer 512 may be correlated with a biometric facial recognition from the gesture and facial analyzer 506 for higher confidence.

The emotion analyzer 512 also assigns an emotion to the primary speaker, from their words, volume levels, gestures, facial expressions (these latter two as parameterized by the gesture and facial analyzer 506). The contention analyzer 510 analyzes words, volume levels (as parameterized by the speech analyzer 508), gestures, and facial expressions to determine a harmony level for the activity indicated in the audio/video. The harmony level, participant id, and emotion are input to a digital annotator 514, along with a present timestamp from a timer 516. An appropriate annotation, indicative of the primary speaker, the level of emotion, and/or the level of contention in the activity is synchronized with a digital document set 520 presently under discussion. This could be a slide in a slide show, a word processing document, a picture, drawing, video, and so on. Example annotations are red highlighting for contentious/emotional areas of/item in a document, blue highlighting for items/ areas for which the data indicates harmonious agreement, and underlining or other styling of areas of intense discussion. The document item/area may also be annotated with the current time and an indication of the primary participant generating the action at that time.

The digital annotator 514 may also track a time spent in discussion of/interaction with a particular document, item, or area. Time tracking may be by participant(s) id, or generally by all in the conference. The time spent in various levels of harmony/contention, or in various emotional states in regards to the document/item/area may also be tracked. Particular reactions to particular documents/items/areas (gestures/expressions/words/tones indicative of particular reactions) may be identified by the annotator. For example, a strong liking may be indicated by nods of approval, accompanied by words re-enforcing that impression. Tracked data and identified reactions may be converted into annotations and associated with the corresponding document/area/item.

Annotations are stored in annotation database 518 and merged/superimposed on the digital document set 520 on a machine display surface 522. This may occur in real-time as the conference is taking place, or later, during post-processing of the video/audio of the conference.

The system may track interactions/reactions not only between participants and documents/items/areas, but also between participants (inter-party).

Figure 6:
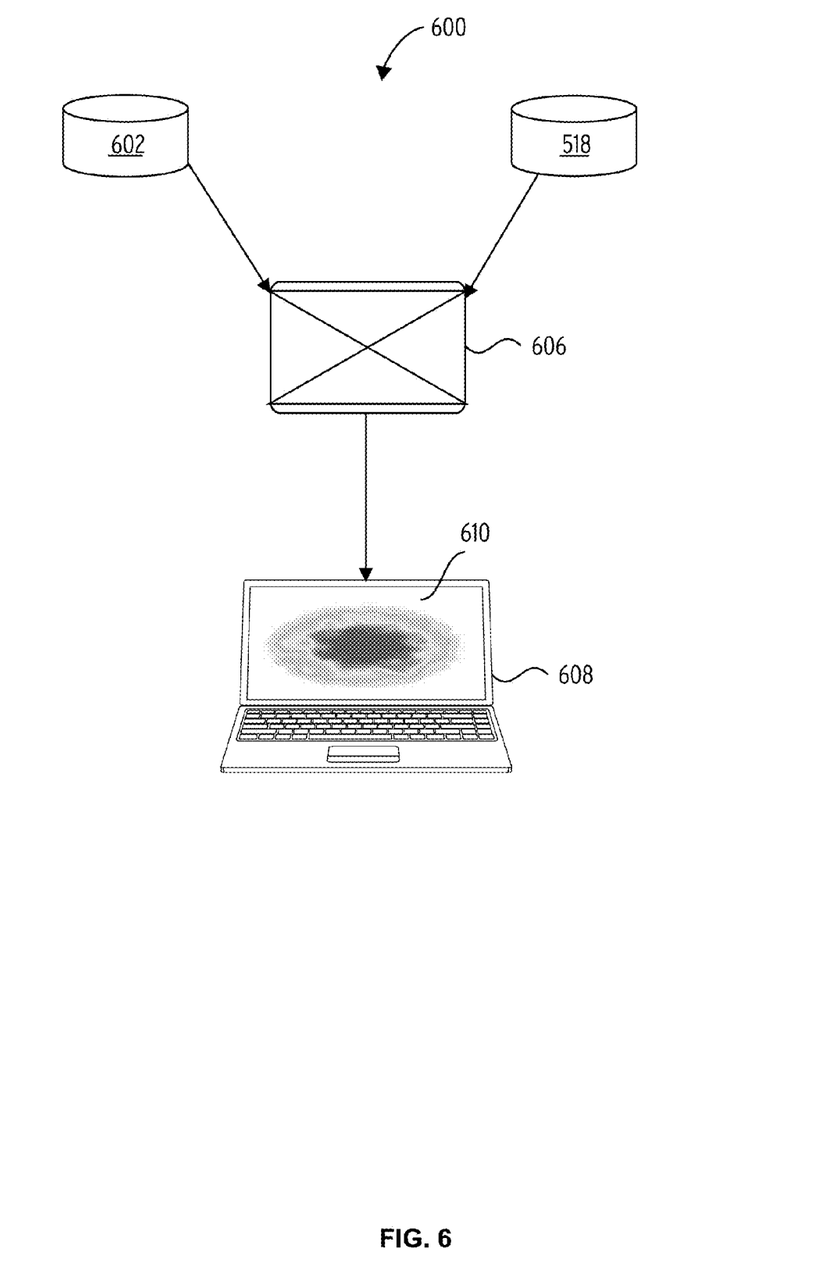
FIG. 6 illustrates a conference room heat mapping system 600 in accordance with one embodiment.

FIG. 6 illustrates a conference room heat mapping system 600 in accordance with one embodiment.

A heat map 610 for the conference may be generated on the display of a data processing device 608 either in real time (during the conference), or afterwards. A heat map 610 visualizes or otherwise reports levels of intensity and their correlation to topics. Heat map logic 606 may input the digital document set 520 presented in a conference (e.g., from a digital document storage system 602) and may also input corresponding and associated annotations from an annotation database 518. Annotation information may include time spent on a document/item/area (by participant or generally), the emotions/reactions expressed generally or by particular participants, levels of harmony/discord (contention level) over a particular document/item/area, and so on. The heat map logic 606 may analyze annotation information across various documents/items/areas, to identify conference topics and determine their associated "heat" level (area of engagement by the conference participants). From these inputs, a report or visualization (e.g., a color coded map, where warmer colors indicate a higher level of engagement) may be generated for the conference (or across multiple conferences).

Figure 7:
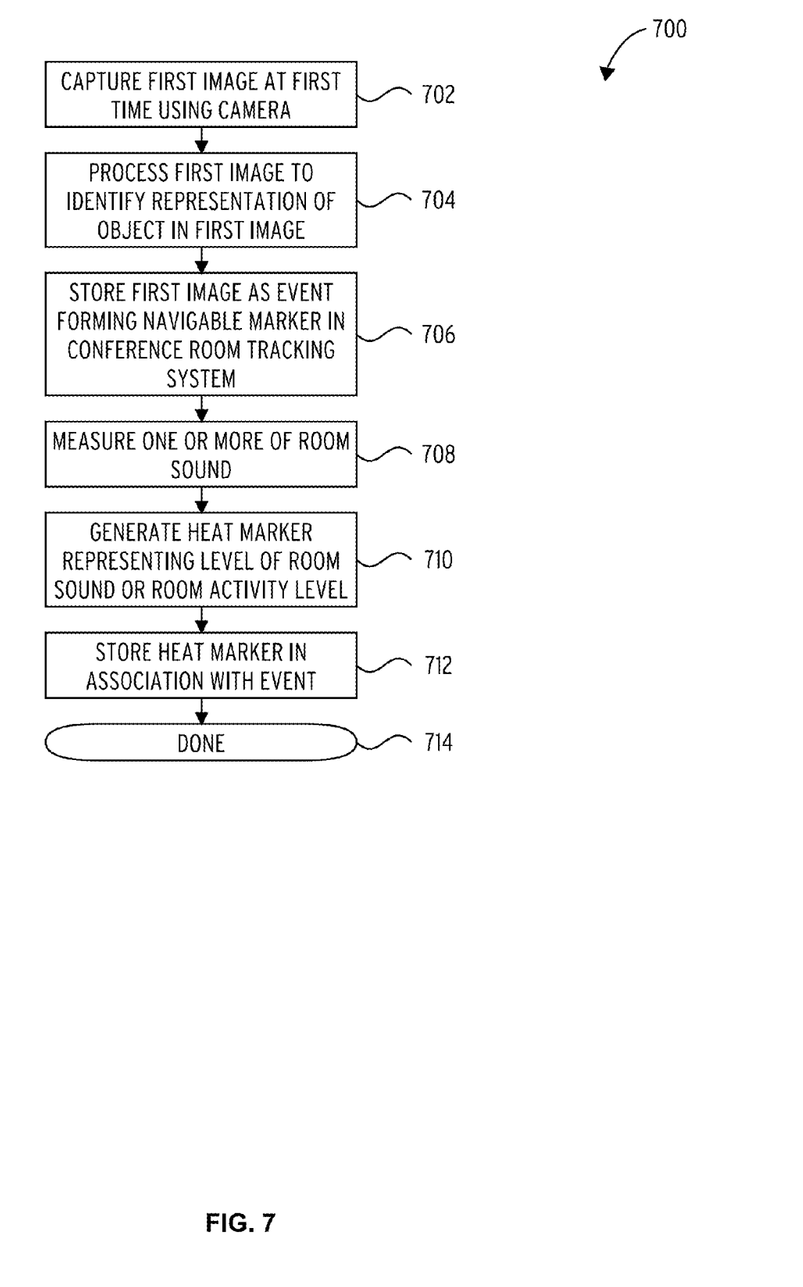
FIG. 7 illustrates a routine in accordance with one embodiment.

In block 702, routine 700 captures a first image at a first time using a camera.

In block 704, routine 700 processes the first image to identify a representation of an object in the first image.

In block 706, routine 700 stores the first image as an event forming a navigable marker in a conference room tracking system.

In block 708, routine 700 measures one or more of a room sound.

In block 710, routine 700 generates a heat marker representing a level of the room sound or the room activity level.

In block 712, routine 700 stores the heat marker in association with the event.

In done block 714, routine 700 ends.

Figure 8:
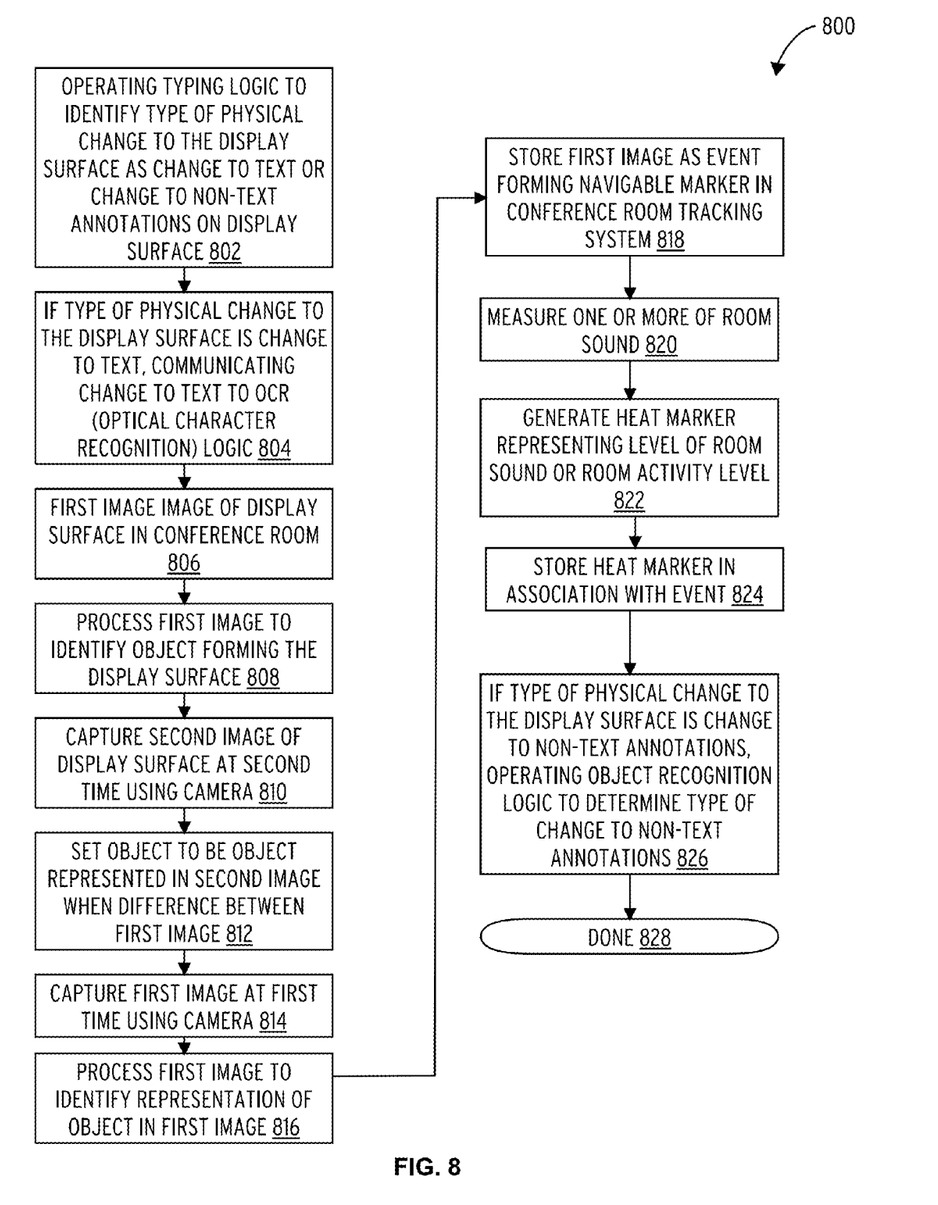
FIG. 8 illustrates a routine in accordance with one embodiment.

In block 802, routine 800 operating typing logic to identify a type of a physical change to the display surface as a change to text or a change to non-text annotations on the display surface.

In block 804, routine 800 if the type of the physical change to the display surface is the change to text, communicating the change to text to OCR (optical character recognition) logic.

In block 806, routine 800 first image an image of a display surface in the conference room.

In block 808, routine 800 processes the first image to identify an object forming the display surface.

In block 810, routine 800 captures a second image of the display surface at a second time using the camera.

In block 812, routine 800 sets the object to be an object represented in the second image when a difference between the first image.

In block 814, routine 800 captures a first image at a first time using a camera.

In block 816, routine 800 processes the first image to identify a representation of an object in the first image.

In block 818, routine 800 stores the first image as an event forming a navigable marker in a conference room tracking system.

In block 820, routine 800 measures one or more of a room sound.

In block 822, routine 800 generates a heat marker representing a level of the room sound or the room activity level.

In block 824, routine 800 stores the heat marker in association with the event.

In block 826, routine 800 if the type of the physical change to the display surface is the change to non-text annotations, operating object recognition logic to determine a type of the change to non-text annotations.

In done block 828, routine 800 ends.

Figure 9:
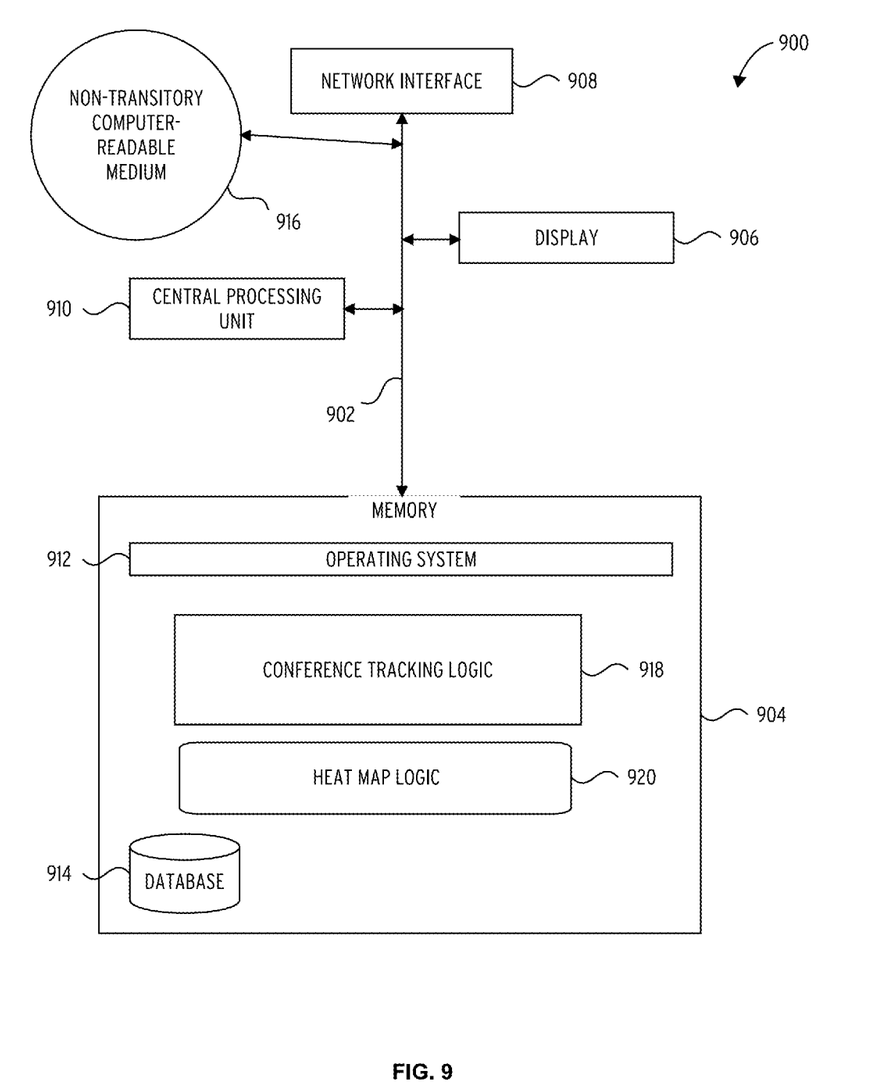
FIG. 9 illustrates a conference server 500 in accordance with one embodiment.

FIG. 9 illustrates several components of an exemplary conference server 900 in accordance with one embodiment. In various embodiments, conference server 900 may include a desktop PC, server, workstation, mobile phone, laptop, tablet, set-top box, appliance, or other computing device that is capable of performing operations such as those described herein. In some embodiments, conference server 900 may include many more components than those shown in FIG. 9. However, it is not necessary that all of these generally conventional components be shown in order to disclose an illustrative embodiment. Collectively, the various tangible components or a subset of the tangible components may be referred to herein as "logic" configured or adapted in a particular way, for example as logic configured or adapted with particular software or firmware.

In various embodiments, conference server 900 may comprise one or more physical and/or logical devices that collectively provide the functionalities described herein. In some embodiments, conference server 900 may comprise one or more replicated and/or distributed physical or logical devices.

In some embodiments, conference server 900 may comprise one or more computing resources provisioned from a "cloud computing" provider, for example, Amazon Elastic Compute Cloud ("Amazon EC2"), provided by Amazon.com, Inc. of Seattle, Wash.; Sun Cloud Compute Utility, provided by Sun Microsystems, Inc. of Santa Clara, Calif.; Windows Azure, provided by Microsoft Corporation of Redmond, Wash., and the like.

Conference server 900 includes a bus 902 interconnecting several components including a network interface 908, a display 906, a central processing unit 910, and a memory 904.

Memory 904 generally comprises a random access memory ("RAM") and permanent non-transitory mass storage device, such as a hard disk drive or solid-state drive. Memory 904 stores an operating system 912. Memory also stores conference tracking logic 918, for example including one or more of the logic components described in conjunction with FIG. 3 and FIG. 4, as loaded from non-transitory computer-readable medium 916.

These and other software components may be loaded into memory 904 of conference server 900 using a drive mechanism (not shown) associated with a non-transitory computer-readable medium 916, such as a floppy disc, tape, DVD/CD-ROM drive, memory card, or the like.

Memory 904 also includes database 914. In some embodiments, conference server 900 may communicate with database 914 via network interface 908, a storage area network ("SAN"), a high-speed serial bus, and/or via the other suitable communication technology.

In some embodiments, database 914 may comprise one or more storage resources provisioned from a "cloud storage" provider, for example, Amazon Simple Storage Service ("Amazon S3"), provided by Amazon.com, Inc. of Seattle, Wash., Google Cloud Storage, provided by Google, Inc. of Mountain View, Calif., and the like.

References to "one embodiment" or "an embodiment" do not necessarily refer to the same embodiment, although they may. Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively, unless expressly limited to a single one or multiple ones. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list, unless expressly limited to one or the other. "Logic" refers to machine memory circuits, non transitory machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter). Those skilled in the art will appreciate that logic may be distributed throughout one or more devices, and/or may be comprised of combinations memory, media, processing circuits and controllers, other circuits, and so on. Therefore, in the interest of clarity and correctness logic may not always be distinctly illustrated in drawings of devices and systems, although it is inherently present therein. The techniques and procedures described herein may be implemented via logic distributed in one or more computing devices. The particular distribution and choice of logic will vary according to implementation. Those having skill in the art will appreciate that there are various logic implementations by which processes and/or systems described herein can be effected (e.g., hardware, software, and/or firmware), and that the preferred vehicle will vary with the context in which the processes are deployed. "Software" refers to logic that may be readily readapted to different purposes (e.g. read/write volatile or nonvolatile memory or media). "Firmware" refers to logic embodied as read-only memories and/or media. Hardware refers to logic embodied as analog and/or digital circuits. If an implementer determines that speed and accuracy are paramount, the implementer may opt for a hardware and/or firmware vehicle; alternatively, if flexibility is paramount, the implementer may opt for a solely software implementation; or, yet again alternatively, the implementer may opt for some combination of hardware, software, and/or firmware. Hence, there are several possible vehicles by which the processes described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations may involve optically-oriented hardware, software, and or firmware. The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood as notorious by those within the art that each function and/or operation within such block diagrams, flowcharts, or examples can be implemented, individually and/or collectively, by a wide range of hardware, software, firmware, or virtually any combination thereof. Several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, flash drives, SD cards, solid state fixed or removable storage, and computer memory. In a general sense, those skilled in the art will recognize that the various aspects described herein which can be implemented, individually and/or collectively, by a wide range of hardware, software, firmware, or any combination thereof can be viewed as being composed of various types of "circuitry." Consequently, as used herein "circuitry" includes, but is not limited to, electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), circuitry forming a memory device (e.g., forms of random access memory), and/or circuitry forming a communications device (e.g., a modem, communications switch, or optical-electrical equipment). Those skilled in the art will recognize that it is common within the art to describe devices and/or processes in the fashion set forth herein, and thereafter use standard engineering practices to integrate such described devices and/or processes into larger systems. That is, at least a portion of the devices and/or processes described herein can be integrated into a network processing system via a reasonable amount of experimentation.

What is claimed is:

1. A method, comprising:
capturing a first image at a first time using a camera;
processing the first image to identify a representation of an object in the first image; storing the first image as an event forming a navigable marker in a conference room tracking system;
measuring room sound and determining from the room sound an emotion or contention level at a time associated with capture of the first image;
generating a heat marker representing the emotion or contention level;
and
storing the heat marker in association with the event.

2. The method of claim 1, further comprising:
the first image an image of a display surface in the conference room; processing the first image to identify an object forming the display surface; capturing a second image of the display surface at a second time using the camera; and setting the object to be an object represented in the second image when a difference between the first image and the second image exceeds a change threshold.

3. The method of claim 2, further comprising:
the change threshold is different for different types of the object forming the display surface.

4. The method of claim 2, further comprising:
operating typing logic to identify a type of a physical change to the display surface as a change to text or a change to non-text annotations on the display surface; and
if the type of the physical change to the display surface is the change to text, communicating the change to text to OCR (optical character recognition) logic.

5. The method of claim 4, further comprising:
if the type of the physical change to the display surface is the change to non-text annotations, operating object recognition logic to determine a type of the change to non-text annotations.

6. The method of claim 2, further comprising:
if an interval between the first time and the second time is less than a configured threshold interval for the object forming the display surface, discarding the second image so that it is not processed to form the event forming the navigable marker.

7. A non-transitory computer-readable storage medium, the computer-readable storage medium including instructions that when executed by a device including a processor and memory, uniquely configure the memory and cause the device to: capture a first image at a first time using a camera;
process the first image to identify a representation of an object in the first image; store the first image as an event forming a navigable marker in a conference room tracking system;
measure room sound and determine from the room sound an emotion or contention level at a time associated with capture of the first image;
generate a heat marker representing the emotion or contention level;
and store the heat marker in association with the event.

8. The computer-readable storage medium of claim 7, wherein the instructions further configure the computer to:
the first image an image of a display surface in the conference room; process the first image to identify an object forming the display surface; capture a second image of the display surface at a second time using the camera; and set the object to be an object represented in the second image when a difference between the first image and the second image exceeds a change threshold.

9. The computer-readable storage medium of claim 8, wherein the instructions further configure the computer to:
operate typing logic to identify a type of a physical change to the display surface as a change to text or a change to non-text annotations on the display surface; and
if the type of the physical change to the display surface is the change to text, communicating the change to text to OCR (optical character recognition) logic.

10. The computer-readable storage medium of claim 9, wherein the instructions further configure the computer to:
if the type of the physical change to the display surface is the change to non-text annotations, operating object recognition logic to determine a type of the change to non-text annotations.

11. A computing apparatus, the computing apparatus comprising: a processor; and
a memory storing instructions that, when executed by the processor, configure the apparatus to:
capture a first image at a first time using a camera;
process the first image to identify a representation of an object in the first image; store the first image as an event forming a navigable marker in a conference room tracking system;
measure room sound and determine from the room sound an emotion or contention level at a time associated with capture of the first image;
generate a heat marker representing the emotion or contention level; and
store the heat marker in association with the event.

12. The computing apparatus of claim 11, wherein the instructions further configure the apparatus to:
the first image an image of a display surface in the conference room; process the first image to identify an object forming the display surface; capture a second image of the display surface at a second time using the camera; and set the object to be an object represented in the second image when a difference between the first image and the second image exceeds a change threshold.

13. The computing apparatus of claim 12, wherein the instructions further configure the apparatus to:
- operate typing logic to identify a type of a physical change to the display surface as a change to text or a change to non-text annotations on the display surface; and
- if the type of the physical change to the display surface is the change to text, communicating the change to text to OCR (optical character recognition) logic.

14. The computing apparatus of claim 13, wherein the instructions further configure the apparatus to:
- if the type of the physical change to the display surface is the change to non-text annotations, operating object recognition logic to determine a type of the change to non-text annotations.

\* \* \* \* \*